March. 4, 1969    U. GERWALT    3,430,294
MACHINE FOR INJECTION-MOLDING OF PLASTICS AND THE LIKE
Filed Aug. 31, 1966    Sheet 1 of 2
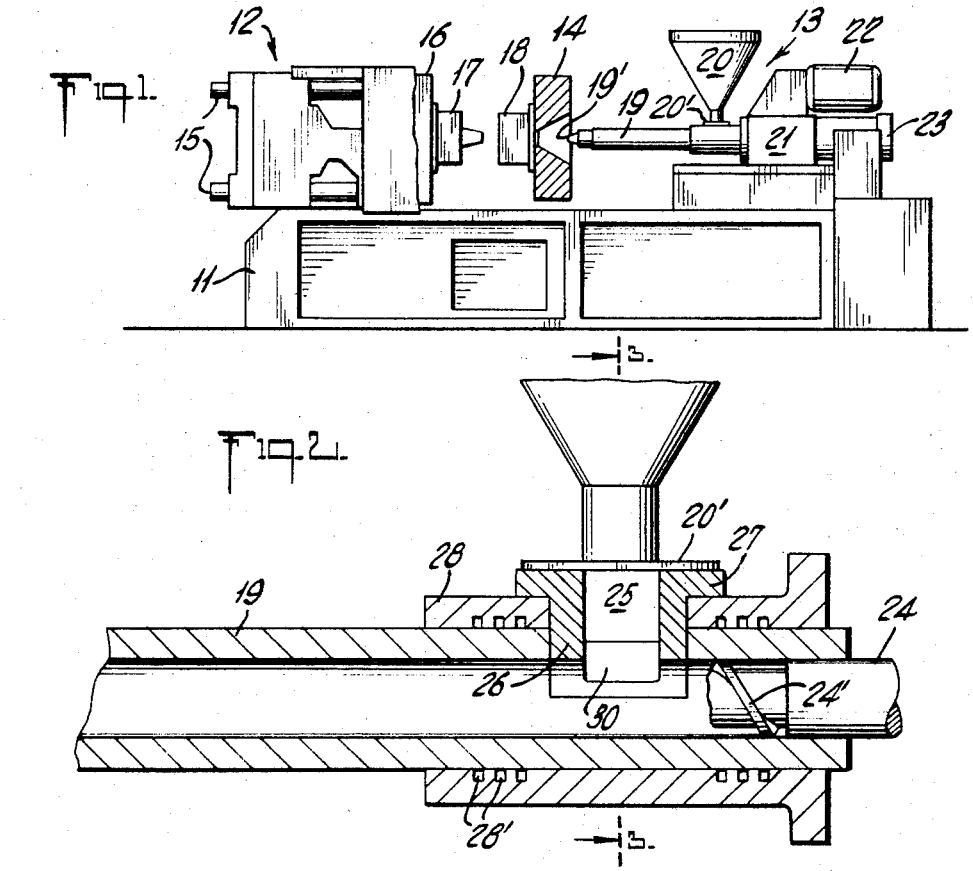
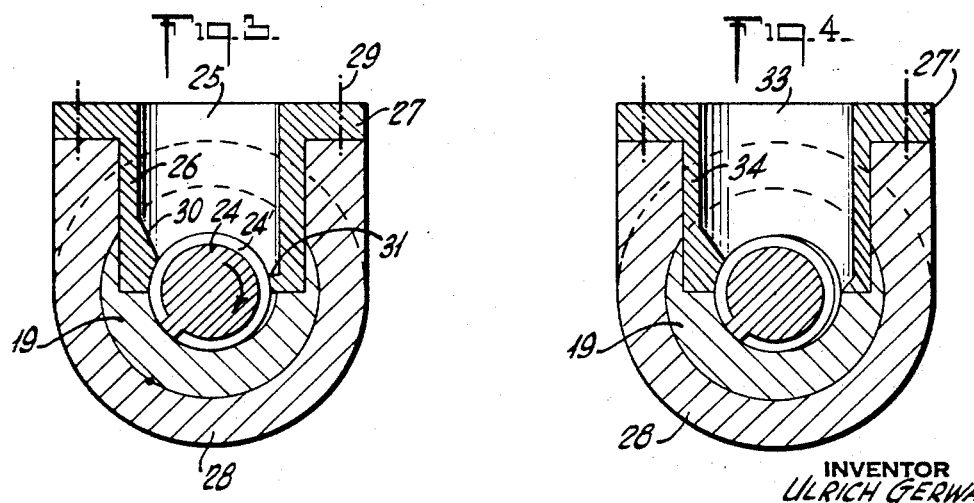
INVENTOR
ULRICH GERWALT
BY
Hoppood & Calimafde
ATTORNEYS March. 4, 1969 U. GERWALT 3,430,294
MACHINE FOR INJECTION-MOLDING OF PLASTICS AND THE LIKE
Filed Aug. 31, 1966 Sheet 2 of 2
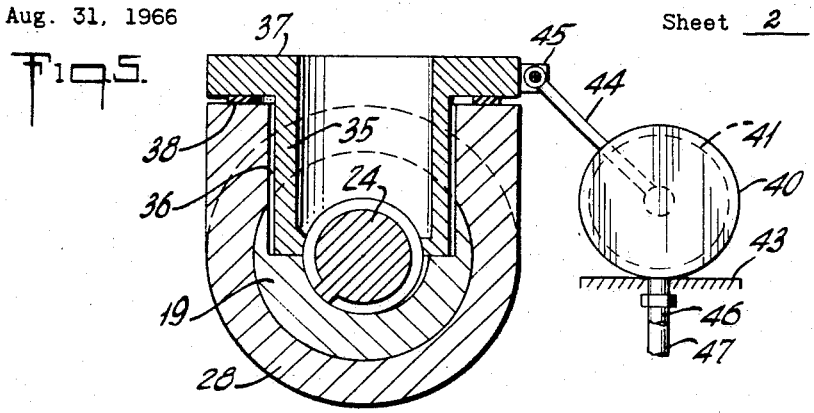
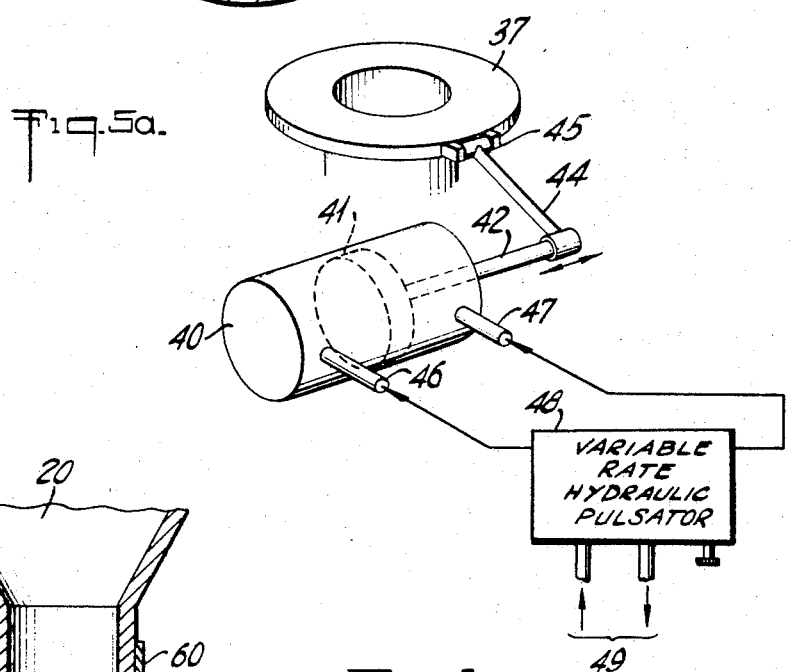
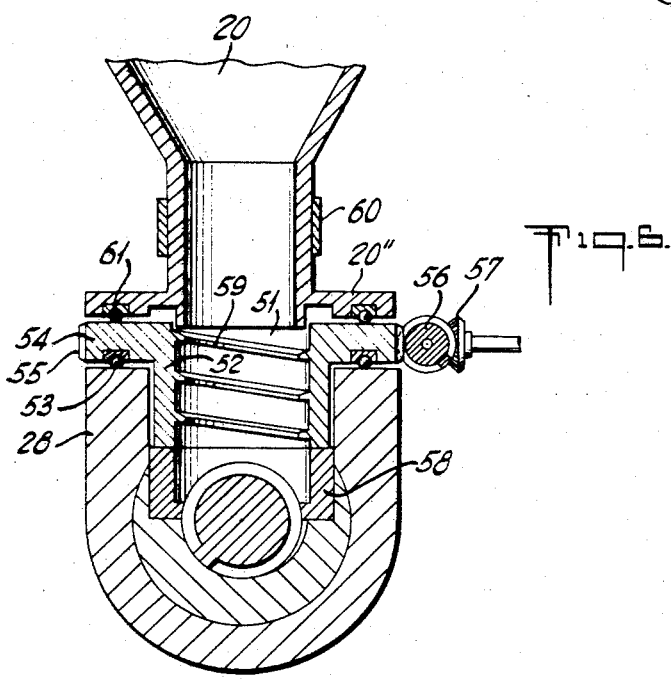
INVENTOR
ULRICH GERWALT
BY
Hopgood & Calimafde
ATTORNEYS United States Patent Office 3,430,294
Patented Mar. 4, 1969

3,430,294
MACHINE FOR INJECTION-MOLDING OF
PLASTICS AND THE LIKE
Ulrich Gerwalt, Nuremberg, Germany, assignor to The
New Britain Machine Company, New Britain, Conn., a
corporation of Connecticut
Filed Aug. 31, 1966, Ser. No. 576,333
U.S. Cl. 18—30                                   13 Claims
Int. Cl. B29f 1/03

ABSTRACT OF THE DISCLOSURE

The invention contemplates an improved plasticizing-cylinder construction, specially configurated at the feed opening or port so as to replaceably receive a selected one of a variety of feed-conduit inserts, each of which is so constructed as to provide an optimum feed relation with the plasticizing screw, depending on the nature of the material to be processed. By this means, not only is the feed passage shaped for optimum feeding, but also the feed passage may be selectively fixed or subjected to intermittent or continuous motion, as needed for optimum feeding of particular materials.

---

The present invention relates to an improved machine for the plasticizing and injection-molding of plastics and the like materials, and in particular to that variety which utilizes a rotating reciprocable screw in a feed cylinder, for the plasticizing and feeding of such material.

In machines of the character indicated, solid material to be plasticized is introduced to the screw threads at a rearward location via a hopper. Rotation of the screw reduces the solid material to a plasticized mass or melt, as the material is forced to an ejection nozzle at the forward end of the cylinder. When melt is being accumulated, in readiness for a mold injection, the melt is stored in the region forward of the screw, forcing the screw to retreat as the quantity of melt accumulates. Mold-injection is accomplished by a driven advance of the screw in the cylinder, using the screw as a feed piston. Thereafter, the process is repeated by having new accumulating melt force the retreat of the screw.

Although such machines are capable of similarly processing a variety of materials in essentially the same manner, it is found that any given machine will not produce optimum plasticizing of as many materials as are desired. For example, it has been found from many series of experiments, as well as from the experience of customers of the machines themselves, that the material-feed opening (for the hopper) in the plasticizing cylinder does not assure equally good feeding for every type of material which is processed. Specifically, in certain types of material, the formation of "bridges" has been observed in the feed opening, while in other types of material the feeding is intermittent (rather than at a uniform rate), thus having a detrimental effect on the desired homogeneity of the melt; further, difficulties with respect to optimum feed have been observed when processing cross-linking materials, such as rubber.

Prior attempts to solve such problems have involved specially constructed feed cylinders with a specially configurated feed opening. However, even the improved feed conditions and results thus obtained cannot conceal the fact that such machines do not constitute an advantageous solution. Aside from the fact that several special-purposes plasticizing cylinders must be kept in stock for each individual processing machine (requiring relatively large storage space), the initial investment becomes such a very substantial factor that replacement of individual plasticizing cylinders for each change of material must be considered uneconomical. Moreover, prolonged down-time for the change-over is also adverse to the economics, since additional cooling and heating times for the plasticizing cylinder (and its replacement) must be tolerated.

It is accordingly an object of the invention to provide a machine avoiding the above-mentioned disadvantages by providing a plasticizing cylinder having a feed opening which is universally applicable to optimum feeding of a substantially extended range of materials to be processed.

Another object is to provide an improved plasticizing cylinder construction which very materially reduces down-time for a given machine which is being changed over, from the handling of one to the handling of another material to be plasticized.

A specific object is to achieve the foregoing objects with a plasticizing-cylinder construction which is configurated, at the feed opening, to replaceably receive a selected one of a variety of feed inserts, each of which is of a construction optimized for the feed of a particular different kind of material to be plasticized.

Another specific object is to provide an improved plasticizing cylinder construction having selective availability of controlled motion at the feed opening, with respect to the main body of the cylinder.

Other objects and various further features of novelty and invention will become apparent to those skilled in the art from a reading of the following specification in conjunction with the accompanying drawings. In said drawings, which show, for illustrative purposes only, preferred forms of the invention:

FIG. 1 is a simplified view in elevation of a plastic injection-molding machine incorporating features of the invention, a part of the mold-clamping mechanism being broken away, and another part being sectioned in the plane of the injection axis, for purposes of clarity;

FIG. 2 is an enlarged fragmentary view in partial sectial, showing parts of the machine of FIG. 1, at the location of feeding unplasticized material into the feed zone of the plasticizing cylinder;

FIG. 3 is a sectional view in the plane 3—3 of FIG. 2;

FIGS. 4, 5, and 6 are views similar to FIG. 3 in order to illustrate different embodiments; and FIG. 5a is a fragmentary schematic diagram, partly in perspective, to further illustrate the embodiment of FIG. 5.

Briefly stated, the invention contemplates an improved plasticizing-cylinder construction, specially configurated at the feed opening or port so as to replaceably receive a selected one of a variety of feed-conduit inserts, each of which is so constructed as to provide an optimum feed relation with the plasticizing screw, depending on the nature of the material to be processed. By this means, not only is the feed passage shaped for optimum feeding, but also the feed passage may be selectively fixed or subjected to intermittent or continuous motion, as needed for optimum feeding of particular materials. Specific forms of fixed and movable feed-conduit insert devices will be described.

Referring to FIGS. 1 to 3 of the drawings, the invention is shown in application to an injection-molding machine have a bed 11, a mold-closing unit 12 and an injection unit 13. The mold-closing unit 12 has, by way of example, a mold-clamping plate 14 which is rigidly arranged on the machine bed 11 and a mold clamping plate 16 which is movable on traverses or guides 15. The mold halves 17–18 of an injection mold are fastened in known manner on the mold-clamping plate 14–16, it being possible to open or close the mold by corresponding forward and backward movement of the mold-clamping plate 16. The plasticizing or feeding cylinder 19 with its filling hopper 20 is arranged on the gear housing 21 of the injection unit 13, and on the opposite side thereof are an electric motor 22 and a hydraulic cylinder 23.

Within the cylinder 19 is an elongated plasticizing screw 24 (FIGS. 2 and 3) having a thread 24' fitting the bore of cylinder 19 for working the fed material to a melt as its progresses forwardly (to the left, in the sense of FIGS. 1 and 2) to the injection-nozzle 19' at the end of cylinder 19. The motor 22 drives screw 24 through gearing 21, and the hydraulic cylinder 23 provides not only the forward (injection) thrust for screw 24, but also offers desired loading against screw 24 as it generates a fresh charge of melt and is driven rearwardly by pressure of the accumulating melt. Cylinder 19 may be provided with heating and cooling devices (not shown).

As the start of an operation of the injection-molding machine of FIG. 1, the mold halves 17–18 of the injection mold are closed, and nozzle 19' is brought against the closed mold. The plastic or other material, which is continuously supplied via the filling hopper 20 and is being plasticized in cylinder 19 by the action of heat and the shearing work of the screw 24, is now forced by axial displacement of the screw 24 out of the collecting space of the plasticizing cylinder 19 via the nozzle bore and into the injection mold 17–18. After lapse of a suitable cooling or curing time, the injection mold is opened again and the finished molded part (or parts) removed from the mold halves 17–18. Each subsequent operating cycle takes place in the same manner.

In accordance with the invention, a separate suitable feed-conduit means or liner insert 25 is selected for the particular material and removably placed in the feed opening or port between hopper 20 and the rear threaded part of the screw 24, all without necessitating removal or any change in set-up of the plasticizing cylinder 19. The particular insert 25 shown provides an internal passage of generally rectangular cross-section and extends into circumferentially enveloping relation with the overlapped portion of screw thread 24', the extent of envelopment being substantially one half the circumference of screw 24. Insert 25 may be provided with a mounting flange 27, seated on the flat upper surface of a suitable mounting or adapter hub fitting 28. Fitting 28 is shown fitted to cylinder 19, and with internal grooves 28' (surrounding cylinder 19) for accommodation of heating or cooling elements as needed for the handling of particular materials. Fitting 28 may be considered part of the cylinder 19, both of which (19–28) are similarly cut open (preferably with a cylindrical bore normal to the screw axis) to define a special port or insert bore into which the projecting wall 26 of insert 25 may be received and supported. Phantom axis designations, as at 29 in FIG. 3, suggest securing means, such a bolts (not shown), for clamping the insert 25 in place, and is desired it will be understood that such bolts may also secure the base flange 20' of the hopper 20.

As previously noted, the conduit or passage with the special insert 25 is especially contoured or configurated for a particular material, which in the case of FIG. 3 is polyethylene. For the screw-rotation direction noted by an arrow in FIG. 3, this involves a ramp 30 on the upcoming side of screw 24 and in close-clearance relation therewith. On the down-turning side of screw 24, a short lip 31 also has close-clearance relation with screw. The net exposure of the insert passage to screw 24 is about 125°, with the lower end of this arc at the lip 31.

For the processing of cross-linking materials, such as rubber in band or bar form, it is of particular advantage if a receiving recess or clearance 32 is provided in the vicinity of the feed opening since such recess, in particular, greatly facilitates the introduction and the putting-in of band-shaped raw material. As can be noted from FIG. 4, the feed passage or opening 33 of another insert 34 exactly meets these requirements. It will be noted that in a change-over from polyethylene to rubber, for example, the feed-conduit means alone need be changed, involving replacement of insert 34 for insert 15, and that the rest of the installation including screw 24, cylinder 19, and fitting 28 (with its thermal devices 28') can remain unchanged.

The embodiments of FIGS. 3 and 4 represent illustrative used of fixed inserts, which rely on gravity alone to bring raw material into contact with the advancing thread of screw 24. For certain other materials, it may be desirable to introduce motion into part of the feed-conduit means in order to obtain optimum feeding, and again a replacement insert is all that need be installed. FIGS. 5 and 6 illustrate two alternatives for introducing such motion.

In FIGS. 5 and 5a, the motion introduced at the feed-conduit means is pulsating or vibratory in nature. This is made possible by forming the cylindrical periphery of insert 35 with a smaller diameter so as to establish an annular clearance 36 with the insertion bore or port in cylinder 19 and its hub fitting 28. Also, the insert flange 37 is spaced by resilient means such as a rubber pad or ring 38 from the flat upper surface of fitting 28. Any one of a number of mechanisms may be employed to introduce the desired vibratory action, and in the form shown a pulsating hydraulic mechanism is illustrated, comprising a cylinder 40, piston 41, and piston rod 42. Cylinder 40 is fixedly mounted to the machine, as suggested at 43, and the end of rod 42 has an offset connection 44 to a point 45 on the periphery of flange 37. Pulsating flows of hydraulic fluid are admitted in alternation to the head and tail fittings 46–47 for cylinder 40, under control of a variable-rate hydraulic pulsator 48 having inlet and exhaust connections 49 to a hydraulic supply; manual adjustment at 50 will be understood to regulate the frequency of pulsation, determining longitudinal oscillation of rod 42 and rotary-reciprocating oscillation of insert 35. The rate of such reciprocation is preferably in the range of one to 200 cycles per second.

In the embodiment of FIG. 6, a part 51 of the inserted feed-conduit means is subjected to continuous rotation. For this purpose, the cylindrical wall 52 of part 51 has clearance relation with the insert bore of fitting 28, and antifriction elements 53 assure the smooth rotary support of insert flange 54 on the flat upper surface of fitting 28. The periphery of flange 54 is toothed at 55, for edge-driven connection to a worm 56, continuously driven by suitable means including gearing 57. The bottom or rotatable insert part 52 clears the screw 24, and in certain cases may discharge directly onto screw 24; however, in the form shown, another insert part 58 is seated in the insert bore of cylinder 19 and fitting 28, being non-rotatably received therein. To enhance the downward feed of raw material the bore of rotatable insert part 51 may be threaded, as shown at 59.

In some cases, particularly when insert part 51 is driven relatively slowly, it will suffice to fix the hopper flange 20' to the flat top surface of flange 54. In other situations, the hopper 20 may be clamped to a fixed part of the machine, as suggested by a clamp ring 60 about the neck of hopper 20. The hopper flange 20" may then be provided with antifriction elements 61 for free-rolling support on the flat upper surface of flange 54.

It will be seen that there has been described an improved injection-molding machine construction meeting the stated objects and offering substantial advantages over prior constructions, and it will be appreciated that modifications may be made without departing from the scope of the invention as defined in the claims which follow.

What is claimed is:

1. In a machine of the character indicated for the plasticizing and injection-molding of plastics and the like materials, an elongated feed cylinder having a laterally open port near one end for reception of material to be plasticized and having an opening at the other end for the discharge of plasticized material, a plasticizing screw supported for rotation and axial reciprocation within said cylinder and axially overlapping said port, and feed-conduit means radially removably carried by said cylinder and extending through said port into enveloping relation with substantially one half the periphery of said screw at the region of axial overlap with said port, whereby said machine may be rapidly converted from optimized loading and plasticizing of one material to optimized loading and plasticizing of a different material merely by replacement of a suitably configured feed-conduit means at said port, without dismounting said cylinder.

2. The machine of claim 1, in which said feed-conduit means is removably secured to said cylinder at said port.

3. In a machine of the character indicated for the plasticizing and injection-molding of plastics and the like materials, an elongated feed cylinder having a laterally open port near one end for reception of material to be plasticized and having an opening at the other end for the discharge of plasticized material, a plasticizing screw supported for rotation and axial reciprocation within said cylinder and axially overlapping said port, feed-conduit means removably carried by said cylinder and extending through said port into enveloping relation with substantially one half the periphery of said screw at the region of axial overlap with said port, whereby said machine may be rapidly converted from optimized loading and plasticizing of one material to optimized loading and plasticizing of a different material merely by replacement of a suitably configured feed-conduit means at said port, said feed-conduit means including a part movably supported by said cylinder, and drive means imparting movement to said part relative to said cylinder.

4. The machine of claim 3, in which said part includes a feed passage communicating with the periphery of said screw, and in which said movement is rotary-reciprocating about the axis of said passage.

5. The machine of claim 3, in which said part includes a feed passage communicating with the periphery of said screw, and in which said movement in continuous-rotary about the axis of said passage.

6. In a machine of the character indicated for the plasticizing and injection-molding of plastics and the like materials, an elongated feed cylinder having a laterally open port near one end for reception of material to be plasticized and having an opening at the other end for the discharge of plasticized material, a plasticizing screw supported for rotation and axial reciprocation within said cylinder and axially overlapping said port, feed-conduit means removably carried by said cylinder and extending through said port into enveloping relation with substantially one half the periphery of said screw at the region of axial overlap with said port, whereby said machine may be rapidly converted from optimized loading and plasticizing of one material to optimized loading and plasticizing of a different material merely by replacement of a suitable configuration feed-conduit means at said port, said feed-conduit means including a fixed part supported by said cylinder in said enveloping relation with said screw, and a movable part movably supported by said cylinder, said fixed and movable parts having aligned openings constituting a feed passage for material to be plasticized, and drive means imparting movement to said movable part relative to said cylinder.

7. The machine of claim 3, in which said drive means includes means for adjustably varying the rate of drive imparted to said movable part.

8. In a machine of the character indicated for the plasticizing and injection-molding of plastics and the like materials, an elongated feed cylinder having a laterally open port near one end for reception of material to be plasticized and having an opening at the other end for the discharge of plasticized material, a plasticizing screw supported for rotation and axial reciprocation within said cylinder and axially overlapping said port, and feed-conduit means removably carried by said cylinder and extending through said port into enveloping relation with substantially one half the periphery of said screw at the region of axial overlap with said port, whereby said machine may be rapidly converted from optimized loading and plasticizing of one material merely by replacement of a suitably configured feed-conduit means at said port, said cylinder at said port having a substantially flat surface surrounding said port and normal to the feed-conduit axis, said feed-conduit means including an outwardly extending flange in circumferential overlap with said surface.

9. The machine of claim 8, and means removably securing said flange to said surface.

10. The machine of claim 8, and means resiliently supporting said flange in spaced relation to said surface.

11. The machine of claim 8, and rotary-bearing means interposed between said flange and said surface.

12. The machine of claim 11, in which said flange is circular, and drive means including tooth formations on the periphery of said flange.

13. In a machine of the character indicated for the plasticizing and injection-molding of plastics and the like materials, an elongated feed cylinder having a laterally open port near one end for reception of material to be plasticized and having an opening at the other end for the discharge of plasticized material, a plasticizing screw supported for rotation and axial reciprocation within said cylinder and axially overlapping said port, feed-conduit means removably carried by said cylinder and extending through said port into enveloping relation with substantially one half the periphery of said screw at the region of axial overlap with said port, whereby said machine may be rapidly converted from optimized loading and plasticizing of one material to optimized loading and plasticizing of a different material merely by replacement of a suitably configured feed-conduit means at said port, said feed-conduit means including a part rotatably supported by said cylinder about the feed axis of said conduit means, and feed threads lining said part.

References Cited

UNITED STATES PATENTS

| | | |
|---|---|---|
| 2,501,595 | 3/1950 | Bohannon. |
| 2,604,659 | 7/1952 | Eppler. |
| 3,188,691 | 6/1965 | Stenger. |
| 3,235,909 | 2/1966 | McIlvin. |

WILBUR L. McBAY, *Primary Examiner.*

U.S. Cl. X.R.

18—12